(12) United States Patent
Hirabayashi

(10) Patent No.: US 10,545,426 B2
(45) Date of Patent: Jan. 28, 2020

(54) POWER SUPPLY APPARATUS AND IMAGE FORMING APPARATUS

(71) Applicant: CANON KABUSHIKI KAISHA, Tokyo (JP)

(72) Inventor: Jun Hirabayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/976,217

(22) Filed: May 10, 2018

(65) Prior Publication Data
US 2018/0335714 A1 Nov. 22, 2018

(30) Foreign Application Priority Data
May 18, 2017 (JP) .................. 2017-098968

(51) Int. Cl.
| | | |
|---|---|---|
| G03G 15/00 | (2006.01) | |
| G03G 15/02 | (2006.01) | |
| H04N 1/00 | (2006.01) | |
| H02M 3/156 | (2006.01) | |
| H02M 1/00 | (2006.01) | |

(52) U.S. Cl.
CPC ......... *G03G 15/0283* (2013.01); *G03G 15/80* (2013.01); *H02M 3/156* (2013.01); *H04N 1/00885* (2013.01); *H02M 2001/007* (2013.01)

(58) Field of Classification Search
CPC ... G03G 15/0283; G03G 15/80; H02M 3/156; H02M 2001/007; H04N 1/00885
See application file for complete search history.

(56) References Cited

U.S. PATENT DOCUMENTS

| | | | | |
|---|---|---|---|---|
| 6,275,018 B1* | 8/2001 | Telefus | ................. | H02M 3/156 |
| | | | | 323/222 |
| 8,102,685 B2 | 1/2012 | Nagasaki et al. | | |
| 8,325,503 B2 | 12/2012 | Nagasaki et al. | | |
| 9,306,466 B2 | 4/2016 | Hirabayashi | | |
| 9,343,985 B2 | 5/2016 | Hirabayashi | | |
| 9,904,232 B2 | 2/2018 | Hirabayashi | | |
| 2009/0001410 A1* | 1/2009 | Shigeta | ................... | H02M 1/08 |
| | | | | 257/133 |
| 2011/0157933 A1* | 6/2011 | Nagasaki | .............. | H02M 3/155 |
| | | | | 363/61 |
| 2012/0087162 A1 | 4/2012 | Nagasaki et al. | | |

(Continued)

FOREIGN PATENT DOCUMENTS

JP         5627607 A      11/2014

OTHER PUBLICATIONS

U.S. Appl. No. 15/976,240, filed May 10, 2018. Applicant: Jun Hirabayashi.

*Primary Examiner* — Alex Torres-Rivera
(74) *Attorney, Agent, or Firm* — Venable LLP

(57) ABSTRACT

The power supply apparatus includes an inductor; a switching element, which is connected in series to the inductor, and is configured to be driven in accordance with an input pulse signal; and a booster circuit, which is connected to both ends of the inductor, and includes a plurality of rectification units each including a diode and a capacitor, wherein the power supply apparatus is configured to repeat an operation of successively driving the switching element in accordance with the input pulse signal in a cycle that is longer than a cycle in which the switching element is successively driven.

13 Claims, 6 Drawing Sheets

(56) References Cited

U.S. PATENT DOCUMENTS

| | | | |
|---|---|---|---|
| 2013/0107584 A1* | 5/2013 | Li | H02M 1/08 |
| | | | 363/21.12 |
| 2015/0016164 A1* | 1/2015 | Takajou | G03G 15/80 |
| | | | 363/84 |
| 2015/0043250 A1* | 2/2015 | Cho | H02M 3/33507 |
| | | | 363/21.09 |
| 2018/0007278 A1 | 1/2018 | Hirabayashi | |
| 2018/0010739 A1 | 1/2018 | Hirabayashi | |

\* cited by examiner

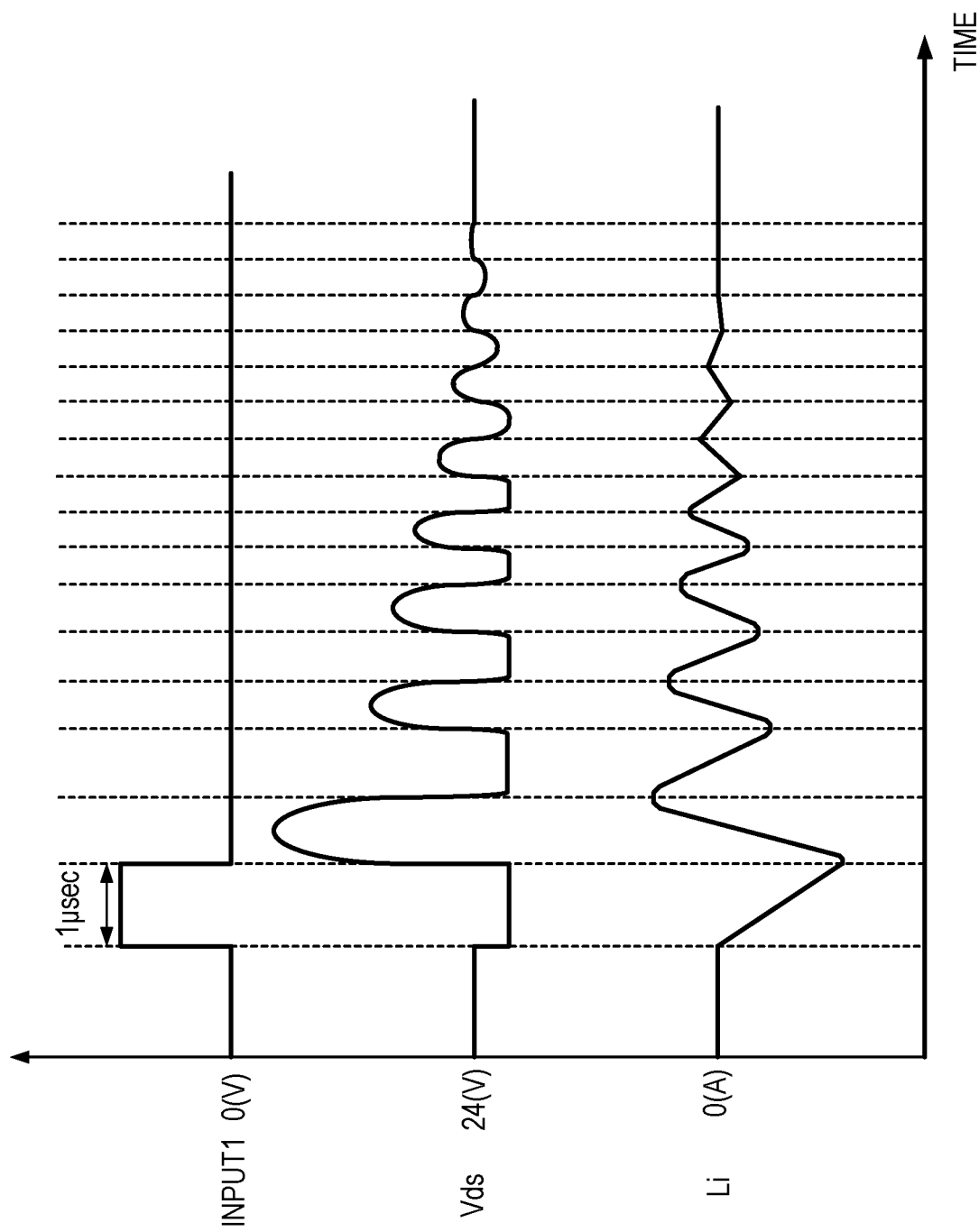

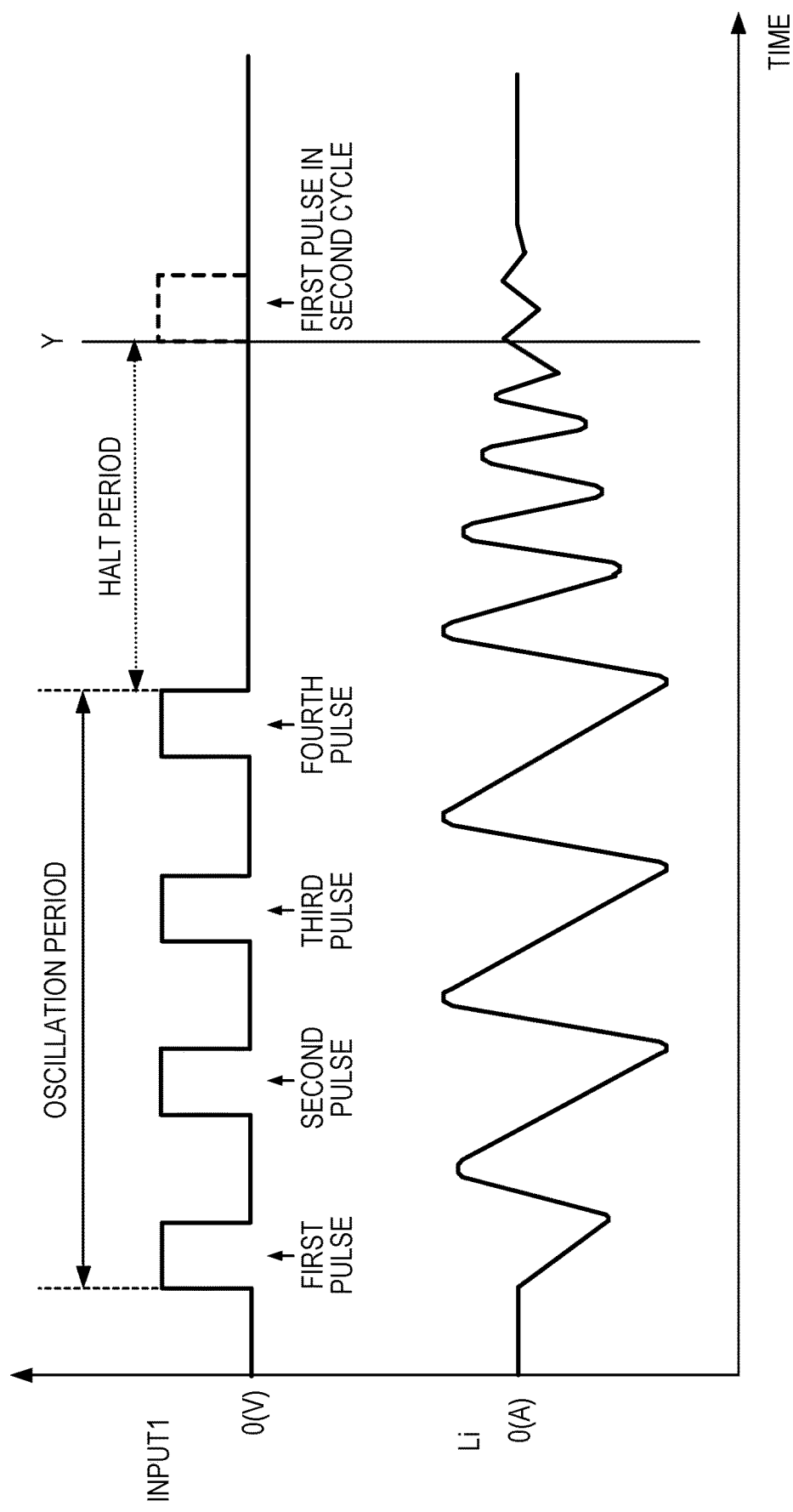

POWER SUPPLY APPARATUS AND IMAGE FORMING APPARATUS

BACKGROUND OF THE INVENTION

Field of the Invention

The present invention relates to a power supply apparatus, for example, a high-voltage power supply configured to generate a high voltage, and an image forming apparatus including the power supply apparatus.

Description of the Related Art

Hitherto, there are various products that handle a high voltage. Examples thereof include air cleaners, air conditioners, ionizers, cathode ray tube televisions, laser printers, and particle accelerators. In many cases, a high voltage is generated by boosting a low voltage, and there are several types of circuits for generating the high voltage. Among the several types of circuits, a circuit called Cockcroft-Walton circuit is often employed. In the Cockcroft-Walton circuit, capacitors and diodes are connected to one another in a ladder-like manner to repeatedly perform charge/discharge and addition of voltages, to thereby boost the voltage. The Cockcroft-Walton circuit can be achieved with a low cost, and hence is often employed.

As an example of a booster circuit using the Cockcroft-Walton circuit (hereinafter referred to as "multistage rectification circuit"), for example, there is given a circuit described in Japanese Patent No. 5627607. A multistage booster circuit requires an AC voltage as an input voltage, and hence is often connected to an output portion of a transformer. However, in Japanese Patent No. 5627607, current flowing to an inductor is turned on and off with use of a field-effect transistor (FET) so that an AC voltage is generated across both ends of the inductor. This AC voltage is input to the multistage booster circuit to generate a high voltage. In this manner, a booster circuit that is cost-efficient and area-efficient is achieved without using a transformer, which is expensive and large in size.

However, the related-art circuit has problems in that the control is complicated, an oscillation frequency is high, and radiation noise frequently occurs. In the related-art example, an output voltage is changed by fixing an OFF time and changing a turn-on time of a switching element so as to avoid hard switching. Then, the output voltage is controlled by changing a frequency in accordance with the output voltage and a control signal. In this circuit, the output voltage and a drive frequency of the switching element have a non-linear relationship, and the frequency is high because the switching element is turned on again at a bottom of a resonant waveform immediately after the switching element is turned off. That is, the output voltage is required to be controlled in accordance with the non-linear characteristic at a high frequency. Therefore, it is difficult to directly control the output voltage by a CPU, and, for example, as disclosed in Japanese Patent No. 5627607, a voltage-controlled oscillator (VCO) or a dedicated IC is used. Further, as disclosed in Japanese Patent No. 5627607, the voltage-controlled oscillator or the dedicated IC is not required when a variable voltage is applied to an inductor, but two ports of the CPU are used for a drive signal and a target voltage signal.

SUMMARY OF THE INVENTION

One embodiment of the present invention is a power supply apparatus and an image forming apparatus, which are capable of reducing variations in output voltage due to variations in components while decreasing an oscillation frequency and reducing noise with use of a simple and low-cost circuit configuration.

Another embodiment of the present invention is a power supply apparatus including an inductor, a switching element configured to be driven in accordance with an input pulse signal, the switching element connected in series to the inductor, and a booster circuit configured to amplify a voltage generated in the inductor, the booster circuit connected to both ends of the inductor, the booster circuit including a plurality of rectification units each including a diode and a capacitor, wherein the switching element is successively driven in accordance with the input pulse signal, and wherein the power supply apparatus is configured to repeat an operation of successively driving the switching element in a cycle longer than a cycle in which the switching element is successively driven.

A further embodiment of the present invention is An image forming apparatus including an image forming unit configured to form an image on a recording material, and a power supply apparatus configured to supply electric power to the image forming unit, the power supply apparatus including an inductor, a switching element configured to be driven in accordance with an input pulse signal, the switching element connected in series to the inductor, and a booster circuit configured to amplify a voltage generated in the inductor, the booster circuit connected to both ends of the inductor, the booster circuit including a plurality of rectification units each including a diode and a capacitor, wherein the switching element is successively driven in accordance with the input pulse signal, and wherein the power supply apparatus is configured to repeat an operation of successively driving the switching element in a cycle longer than a cycle in which the switching element is successively driven.

Still further features of the present invention will become apparent from the following description of exemplary embodiments with reference to the attached drawings.

BRIEF DESCRIPTION OF THE DRAWINGS

FIG. 2 is a graph for showing respective waveforms in the first embodiment.

FIG. 5 is a graph for showing a relationship between an input pulse signal and a current in a second embodiment of the present invention.

DESCRIPTION OF THE EMBODIMENTS

Now, modes for carrying out the present invention are described below in detail based on embodiments with reference to the drawings.

[Power Supply Apparatus]

Figure 1:
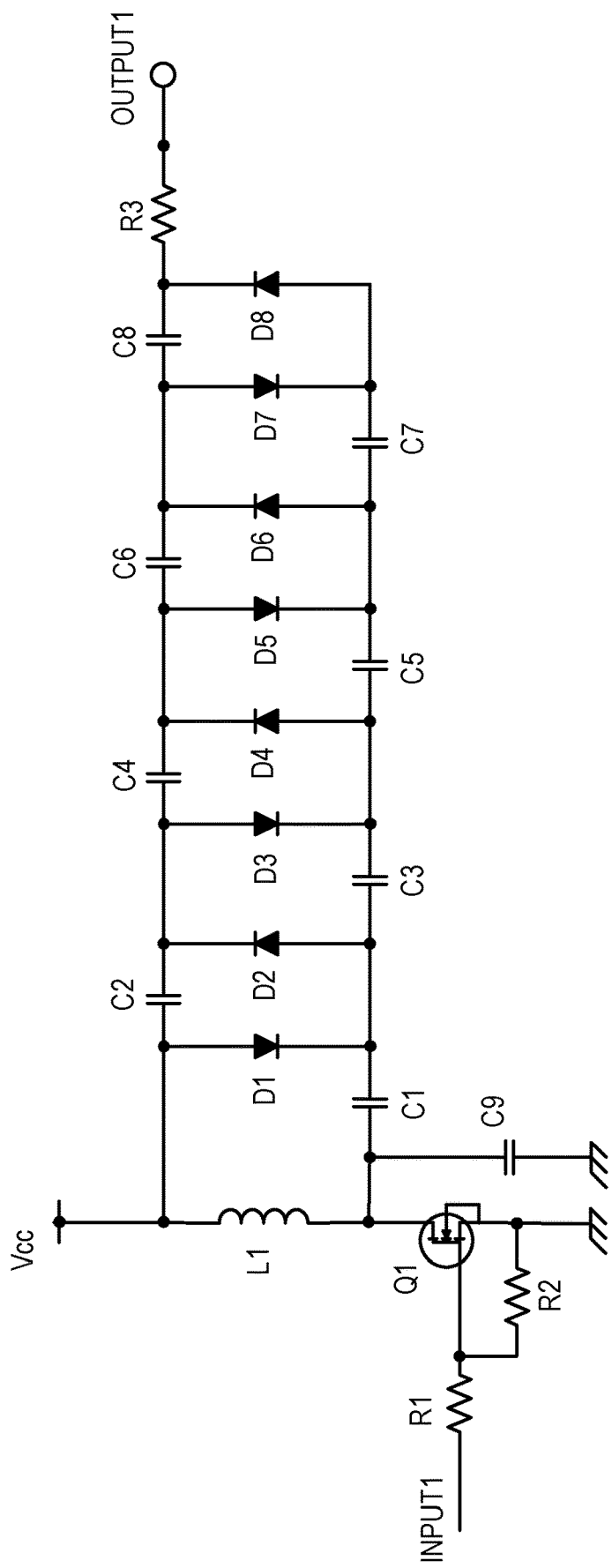
FIG. 1 is a circuit diagram of a multistage booster circuit in a first embodiment of the present invention.

FIG. 1 is a circuit diagram of a power supply apparatus according to a first embodiment of the present invention. A circuit illustrated in FIG. 1 is a multistage rectification circuit, and is configured to boost a voltage by repeatedly charging capacitors and adding the voltages. The multistage rectification circuit includes a resistor R1 to a resistor R3, a coil L1, a MOSFET (hereinafter referred to as "FET") Q1, which is a type of field-effect transistor, a capacitor C1 to a capacitor C9, and a diode D1 to a diode D8. A transistor may be used as Q1. Further, "Vcc" represents a DC voltage, which is, for example, 24 V.

In the power supply apparatus of FIG. 1, the FET Q1 serving as a switching element is turned on or off in accordance with a pulse signal input to a gate terminal thereof, to thereby drive the coil L1. Further, the diode D1 and the capacitor C1, the diode D2 and the capacitor C2, and other combinations of the diodes and the capacitors each function as a rectification unit. The multistage rectification circuit is a circuit including a plurality of such rectification units. The multistage rectification circuit is connected to both ends of the coil L1, and is configured to amplify a voltage induced in the coil L1. The power supply apparatus according to the first embodiment is a power supply apparatus configured to output an output voltage boosted from the input voltage (Vcc=24 V) from an output 1. This power supply apparatus is a so-called circuit configured to generate a high voltage without using components such as an electromagnetic transformer (winding coil) or a piezoelectric transformer (in the first embodiment, this circuit is also referred to as a "transformerless" circuit). This circuit is effective as a configuration capable of reducing a height of a power supply board.

An operation principle of the power supply apparatus according to the first embodiment is simply described. First, a square-wave pulse signal is input to an input 1 so that the FET Q1 is turned on or off. When the FET Q1 is turned on, current flows through the coil L1, and thus the coil L1 is charged with magnetic flux energy. At the same time, current flows from the diode D1 to the capacitor C1, and thus the capacitor C1 is charged. At this time, the voltage with which the capacitor C1 is charged is a voltage generated across both ends of the coil L1, that is, substantially the same voltage as the DC voltage Vcc. Next, when the FET Q1 is turned off, the coil L1 generates, due to self-induction thereof, a voltage that has a polarity opposite from that of the voltage generated before the FET Q1 is turned off and is larger than the DC voltage Vcc across both ends of the coil L1. This voltage and the voltage charged in the capacitor C1 are connected in series, and those voltages are added so that the capacitor C2 is charged with the voltage obtained by the addition via the diode D2. In the following stages, the same structures are provided for all circuits on the right side of the diode D2 and the capacitor C2, and the same principle is repeatedly applied so that the voltage is amplified.

Next, a pulse signal to be input to the gate terminal of the FET Q1 is described. In FIG. 2, as an example, there are shown a waveform of a drain-source voltage Vds (unit: V) of the FET Q1 and a waveform of a current Li (unit: A) flowing through the coil L1 at a time when one square wave having a turn-on time of 1 μsec (microsecond) is input to the input 1. The horizontal axis indicates time in each case. The voltage Vds is positive (high voltage) on the upper side of the axis, and the current Li is positive in the case of an upward direction of the coil L1 in FIG. 1. When the current Li is equal to or larger than 0 (A) (positive), a DC voltage Vcc or a current flows from the coil L1 in the direction of the diode D1 and the capacitor C2. When the current Li is smaller than 0 (A) (negative), a current flows from the coil L1 in the direction of the FET Q1 and the capacitor C1. That is, the current Li of FIG. 2 is negative when the current flows from the coil L1 toward the FET Q1.

As shown in FIG. 2, the waveform of the voltage Vds has the highest peak immediately after the FET Q1 is turned off, and then attenuates while repeating free oscillation. The high voltage generated immediately after the FET Q1 is turned off is a self-induced electromotive force of the coil L1. The multistage rectification circuit is also one type of peak-hold circuit, and hence as the temporary surge of the voltage immediately after the turn-off becomes higher, the voltage finally output from the output 1 becomes higher. Further, the current Li is a current flowing through the coil L1, and hence the phase of the free oscillation is delayed with respect to the phase of the voltage Vds.

[Relationship Between Phase of Waveform of Current Li and Timing to Input Pulse Signal]

Incidentally, in FIG. 2, there are shown waveforms obtained when one pulse signal is input to the input 1. In actuality, however, successive oscillation is required to maintain the high voltage state of the output 1. Therefore, successive pulse signals (hereinafter also referred to as "successive pulses") are required to be input to the gate terminal of the FET Q1. It is known that the voltage obtained from the output 1 greatly changes depending on the relationship between the timing to input the second pulse signal to the input 1 and the state of the coil L1 at that time.

Figure 3A:
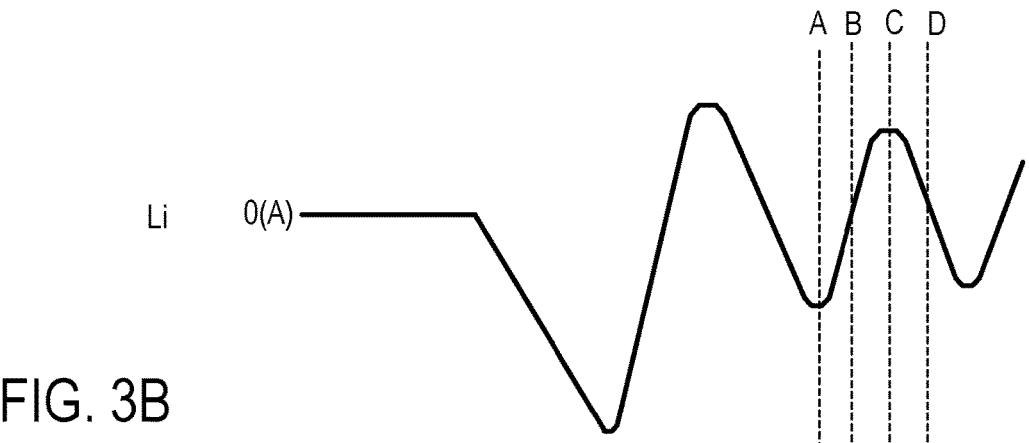
FIG. 3A, FIG. 3B, and FIG. 3C are graphs for showing waveforms in the first embodiment.

FIG. 3A is a graph for showing a part of the current Li of FIG. 2 in an enlarged manner. Symbols A to D shown in FIG. 3A indicate the following parts, and correspond to phases of the current waveform. Symbols A to D are hereinafter also referred to as a phase A to a phase D, respectively.

A: point at which the value of the current Li is the lowest among Symbols A to D and no current change occurs B: in the middle of increase of the current Li in the positive direction The positive direction of the current Li refers to a direction in which the current increases toward a direction opposite to the FET Q1 (direction from L1 to Vcc).

C: point at which the value of the current Li is the highest among Symbols A to D and no current change occurs D: in the middle of increase of the current Li in the negative direction The negative direction of the current Li refers to a direction in which the current increases toward the FET Q1 (direction from L1 to Q1).

Figure 3B:
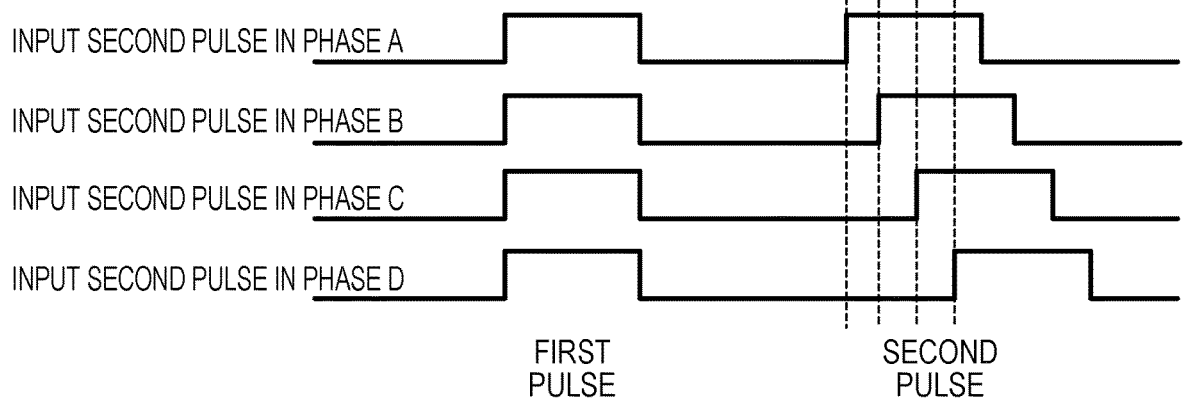

In FIG. 1, a resistance value of the resistor R1 is set to 270Ω, a resistance value of the resistor R2 is set to 33 kΩ, and a resistance value of the resistor R3 is set to 1.12 MΩ. Further, an inductance of the coil L1 is set to 220 pH, a capacitance of each of the capacitors C1 to C8 is set to 4,700 pF, and a capacitance of the capacitor C9 is set to 470 pF. With use of those values, in which phase of the waveform of the current Li the second pulse signal is preferred to be input after the first pulse signal is input was studied. The results of the study are shown in FIG. 3B and Table 1.

TABLE 1

| | Phase in which second pulse is input | Effective value of voltage measured at output 1 |
|---|---|---|
| Second wave | A | 540 V |
| | B | 407 V |
| | C | 324 V |
| | D | 499 V |
| Third wave | A | 514 V |
| | B | 422 V |
| | C | 336 V |

TABLE 1-continued

| | Phase in which second pulse is input | Effective value of voltage measured at output 1 |
|---|---|---|
| | D | 465 V |
| Fourth wave | A | 503 V |
| | B | 417 V |
| | C | 341 V |
| | D | 450 V |
| Fifth wave | A | 497 V |
| | B | 423 V |
| | C | 347 V |
| | D | 443 V |
| Sixth wave | A | 260 V |
| | B | 182 V |
| | C | 156 V |
| | D | 233 V |

When the second pulse signal is input at a timing of each of the phase A to the phase D with respect to the free oscillation of the current Li after the FET Q1 is turned off, waveforms as shown in FIG. 3B are obtained. In actuality, there is a time difference between the timing at which the pulse signal is input and the timing at which the FET Q1 is turned on due to a gate capacitance of the FET Q1 or other reasons, but for the sake of convenience, it is considered here that the FET Q1 is turned on at the timing at which the pulse signal is input.

Further, Table 1 is a table for showing an effective value of the voltage measured at the output 1 when the second pulse signal is input in each of the phase A to the phase D as shown in FIG. 3B. The measurement was performed in such a manner that, assuming that the maximum temporary surge obtained immediately after the FET Q1 was turned off was the first wave, the frequency was finely adjusted so that the next pulse signal was similarly input to the free oscillations of the second wave to the sixth wave at each of the positions of the phase A to the phase D. That is, the phase A to the phase D of the second wave are exactly the waveforms shown in FIG. 3B. It is understood from Table 1 that the highest output voltage is obtained when the FET Q1 is turned on again at the timing of the phase A in every free oscillation waves of the second wave to the sixth wave.

The reason therefor is considered to be because turning on the FET Q1 means increasing the current Li in the negative direction, and the coil current can be further increased by turning on the FET Q1 when the coil current at the timing at which the FET Q1 is turned on is positioned at the maximum negative value. As a result, in order to obtain the highest output voltage, it is preferred to turn on the FET Q1 again at the timing of the phase A of the waveform of the current Li. It has been described here that the second pulse signal may by input in the phase A when the highest output voltage is desired to be obtained from the output 1. However, for example, when a lower output voltage is desired to be obtained from the output 1, the second pulse signal may be input in other phases, and the timing to input the second pulse signal is not limited to the phase A.

[Relationship Between Free Oscillation of Current Li and Timing to Input Pulse Signal]

Next, at which wave of the second wave to the sixth wave or the subsequent waves of the waveform of the free oscillation of the current Li the FET Q1 is preferred to be turned on again is considered. In the case of the configuration of FIG. 1, the supply capacity as the power supply circuit is increased as the frequency is increased. However, radiation noise or conduction noise is increased when the frequency is increased. Therefore, the oscillation frequency is desired to be suppressed to a minimum frequency that can satisfy the supply capacity required as the power supply circuit. However, when the oscillation frequency is decreased, there arises a problem in that variations in output voltage are increased due to variations in components. This problem is described with reference to FIG. 3C.

Figure 3C:
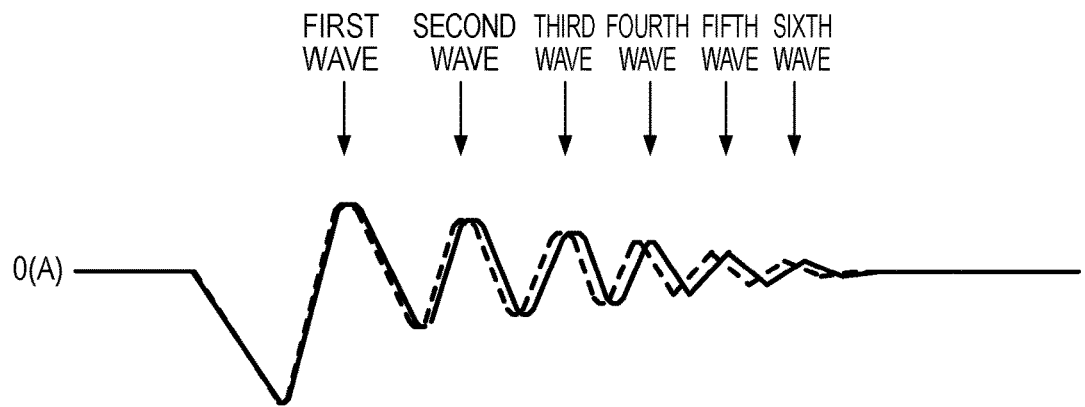

FIG. 3C is a graph for showing a shift of a waveform that is assumed when component characteristics vary from the waveform of the current Li of FIG. 2. The solid line indicates a case in which no variation occurs, and the broken line indicates a case in which variations occur. When the inductance of the coil L1 and the capacitance of the capacitor or the diode in the circuit of FIG. 1 vary, the resonant frequency also varies. Therefore, as indicated by the solid line and the broken line of FIG. 3C, the phase of the free oscillation of the current Li is shifted. In FIG. 3C, the oscillation is converged after the sixth wave, but the convergence is shown only to illustrate the attenuation. In an actual circuit, the oscillation is not converged around the sixth wave, and the oscillation continues for a long time unless a large resistance component is present in the resonant circuit.

It is understood from FIG. 3C that, among the waves of the free oscillation of the current Li, the fourth wave to the sixth wave have a larger phase shift than that of the first wave. This is because the phase shift so far is accumulated as the time elapses. Decreasing the oscillation frequency means turning on the FET Q1 again at a timing of a wave with a large number in FIG. 3C, that is, a timing at which a longer time has elapsed from when the FET Q1 is turned off. Thus, when the oscillation frequency is decreased, the pulse signal is input at a wave having a large phase shift. Therefore, even when the pulse signal is intended to be input at the timing of the phase A of the current Li, the pulse signal may be input at the position of the phase B or the phase D depending on the board.

[Timing to Input Pulse Signal in First Embodiment]

Figure 4A:
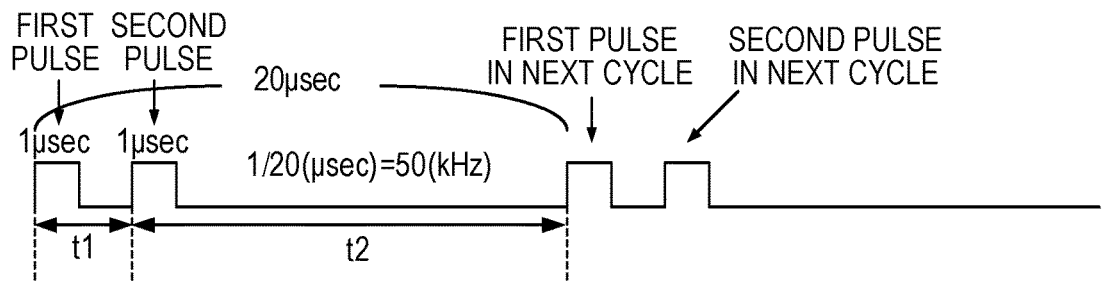
FIG. 4A, FIG. 4B, and FIG. 4C are graphs for showing a relationship among an input pulse signal, a current, and a voltage described in the first embodiment.

Therefore, in the first embodiment, the FET Q1 is driven by the pulse signals shown in FIG. 4A. As described above, the free oscillation of the current flowing through the coil L1 has a larger phase shift as time elapses from when the FET Q1 is turned off. Therefore, in the first embodiment, after the first pulse signal is input to the FET Q1, the second pulse signal is input at a wave that substantially does not have the phase shift due to variations in components, for example, at the second wave or the third wave. Symbol t1 of FIG. 4A represents a time period from the rising of the first pulse signal to the rising of the second pulse signal, and symbol t2 represents a time period from the rising of the second pulse signal to the rising of the first pulse signal in the next cycle. As shown in FIG. 4A, the pulse signals are not input to the FET Q1 at equal intervals, and hence the time period from the rising of the first pulse signal to the rising of the first pulse signal in the next cycle is set to an oscillation cycle. The oscillation cycle is a sum of t1 and t2. In FIG. 4A, the turn-on time of each of the first pulse signal and the second pulse signal is 1 μsec (microsecond), the oscillation cycle is 20 μsec, and the oscillation frequency is 50 kHz.

Figure 4B:
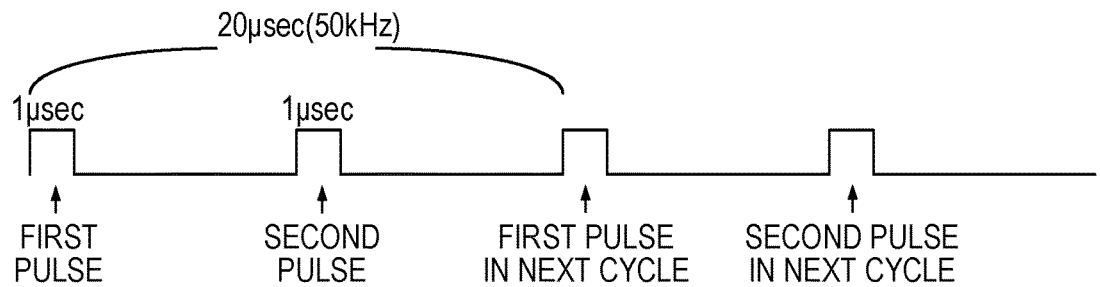
Figure 4C:
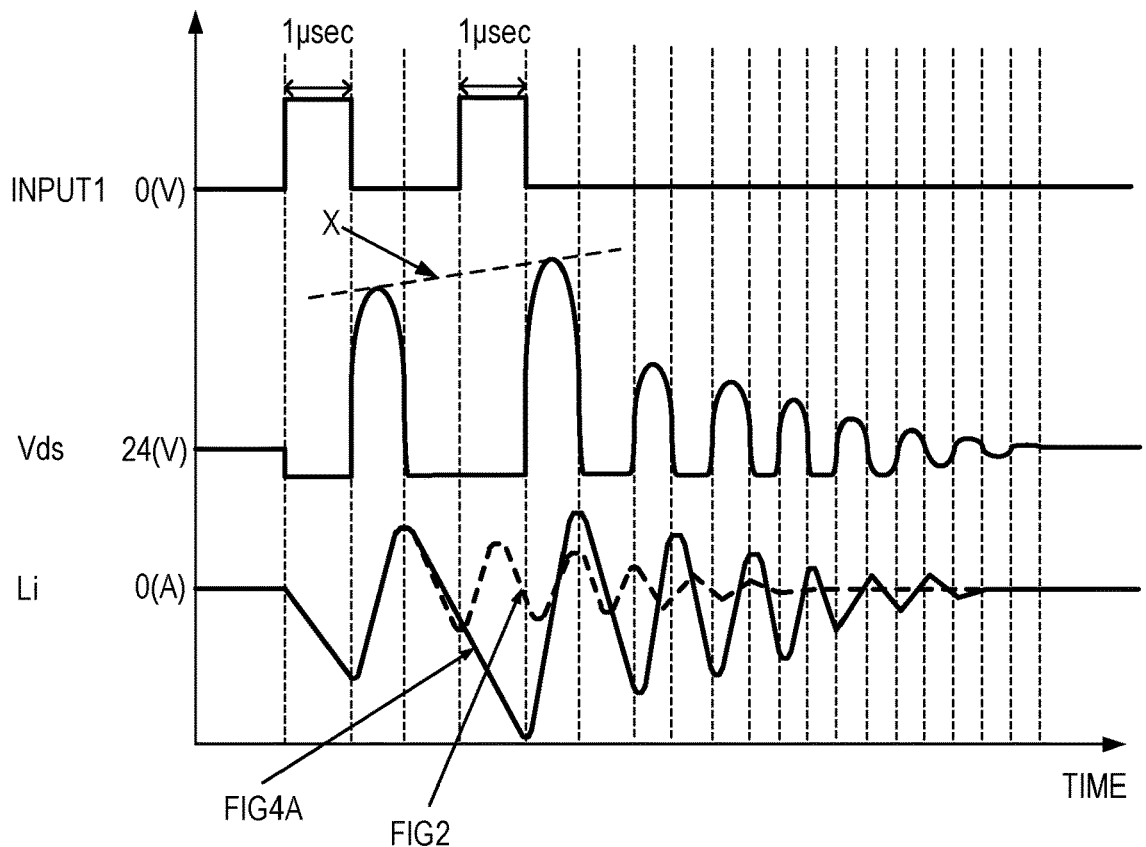

Further, FIG. 4B is a graph for showing the related-art method in which the first and second pulse signals are input to the FET Q1 at equal intervals (constant frequency). FIG. 4C is a graph for showing the case of FIG. 4A as in FIG. 2. In the current Li, the solid line indicates a case in which the pulse signals as shown in FIG. 4A are input, and the broken line indicates the current Li of FIG. 2. As control signals for driving the FET Q1, when N is set to an integer of 1 or more, an interval between an N-th control signal and an (N+1)-th control signal corresponds to a cycle in which, in the oscillation waveform of the drain-source voltage generated after the FET Q1 is turned off, the maximum value of (N+1)-th and subsequent amplitudes becomes higher than the maximum value obtained at the time of the first rise of the oscillation waveform immediately after the N-th turn-off. The FET Q1 is driven so that the FET Q1 is turned on at the timing of the second wave of the free oscillation wave of the coil L1 after the FET Q1 is turned off for the first time. The turn-on timing of the FET Q1 is the timing at which the current flowing through the coil L1 flows in the same direction as the direction of the current flowing when the FET Q1 is turned on.

As described above, in the present invention, as shown in FIG. 4A, the interval between the first pulse and the second pulse is reduced so that a long halt time is taken. As a result, the second pulse is input to a wave before the phase of the current Li is greatly shifted, and hence the variations in voltage, which appear at the output 1 of each board due to the variations in components, can be reduced as compared to the method of FIG. 4B, in which the pulses are input at equal intervals.

Further, when the phase shift of the current Li is small when the second pulse signal is input, as for the second pulse, the FET Q1 can be turned on at an intended timing (for example, phase A) with higher accuracy. That is, as described above, in FIG. 3A to FIG. 3C, when t1 is set to such a time period that enables the FET Q1 to be turned on again in the phase A of the waveform of the current Li, the energy supply efficiency rises, and a higher voltage can be output from the output 1. At this time, in the drain-source voltage Vds of the FET Q1, as indicated by the broken line X in FIG. 4C, the temporary surge of the voltage that is based on the second pulse signal is observed to be higher than the temporary surge of the voltage that is based on the first pulse signal. This reason is because, when the FET Q1 can be turned on in the phase A, the turn-on based on the second pulse signal can be performed more effectively than that based on the first pulse signal. In the case of this example, the time period of t2 inevitably has a value obtained by subtracting the time period t1 from 20 μsec.

[Comparison Between Related-Art Method and First Embodiment]

The output voltage measured at the output 1 when the pulse signals of FIG. 4A and FIG. 4B are actually input to the input 1 while the respective elements are maintained to have the same values is shown in Table 2.

TABLE 2

|   | Related-art method | First embodiment |
|---|---|---|
| A | 514 V | 546 V |
| B | 376 V | 453 V |
| C | 364 V | 426 V |
| D | 421 V | 502 V |

Table 2 is a table for showing the output voltage obtained when the second pulse signal is input in each of the phase A to the phase D in the related-art method (FIG. 4B) and the method in the first embodiment (FIG. 4A). The input pulse signals are basically the same as those in FIG. 4A and FIG. 4B. The related-art method has a cycle of 10 μsec, and the method in the first embodiment has a cycle of 20 μsec in which two pulse signals are successively input, but the cycles are slightly shifted in order to show the output voltage in each phase. As a result, it is understood that, although the average ON time of the FET Q1 is the same, a higher voltage is obtained when the drive is performed in the method in the first embodiment than when the drive is performed in the related-art method in any phase. For example, there is a difference in output voltage between the related-art method and the method in the first embodiment even when the pulse signal is input in the same phase A. The reason is considered to be because, while the second pulse signal is input in the phase A after the free oscillation is attenuated in the related-art method, the pulse signal is input in the phase A at the second wave of the free oscillation in the method in the first embodiment.

Further, as compared to the case in which a pulse signal having a constant frequency is input as shown in FIG. 4B, in the method in the first embodiment, the frequency is not just simply increased, and hence the method in the first embodiment has an advantage in terms of noise. Specifically, the frequency component that has been only 100 kHz is divided into two components of a high frequency component (1/t1) and a low frequency component (1/t2) because there is a difference between t1 and t2, and thus a frequency diffusion effect can be obtained. In general, the noise energy is dispersed when the drive frequency is diffused, and hence a noise reduction effect can be obtained.

As described above, according to the first embodiment, with a simple and low-cost circuit configuration, the variations in output voltage due to the variations in components can be reduced while the oscillation frequency is decreased and the noise is reduced.

In the first embodiment, there is shown an example in which two pulse signals are input at a short interval as in FIG. 4A, but the number of pulse signals is not actually limited to two. When a higher supply capacity is required as the power supply circuit, in addition to methods such as increasing the oscillation frequency and extending the turn-on time (1 μsec), there is also a method of successively inputting two or more pulse signals to the input 1 in the first embodiment.

For example, the basic idea is the same even when three pulse signals are successively input. In FIG. 4C, the time period t1 is selected for the second pulse signal so that the FET Q1 can be turned on based on the second pulse signal at a timing of the phase A of the second wave of the free oscillation waveform of the current Li. The third pulse signal may be input similarly at the timing of the phase A of the second wave of the free oscillation generated after the FET Q1 is turned off after the FET Q1 is turned on based on the second pulse signal. As described above, N (N>2) or more pulse signals are successively input to the FET Q1, and the N-th pulse signal may be input at an intended timing of the second wave of the free oscillation of the current flowing through the coil L1, which is obtained after the FET Q1 is turned off after the (N−1)-th pulse signal is input.

In this manner, it is also possible to perform an operation of inputting four or five pulse signals at short intervals. Such an operation of performing frequent oscillation at short intervals and providing a long halt period is an operation of so-called intermittent oscillation (hereinafter referred to as "intermittent oscillation operation"). The intermittent oscillation operation may increase the ripples of the output voltage. Further, from the viewpoint of noise, a higher frequency causes larger noise energy, and hence the noise may be increased by performing frequent oscillation at short intervals.

Further, when the halt period of the case in which the operation is regarded as the intermittent oscillation operation is decreased too much, there arises a problem in that the variations in output voltage are increased again. This state is described as a second embodiment of the present invention with reference to FIG. 5. FIG. 5 is a graph for showing the waveform of the pulse signal input to the input 1 and the waveform of the current Li. The horizontal axis indicates time, and there is shown an example of a case in which four pulse signals are successively input at short intervals. The waveform of the current Li after the fourth pulse signal is input in the oscillation period and the FET Q1 is turned on is converged while performing free oscillation.

In this case, it is assumed that, at a time point of "Y" in FIG. 5, the first input in the oscillation period of the next cycle is performed. The first pulse signal in the next cycle at this time is indicated by the broken line, and a period from the falling of the fourth pulse signal in the previous cycle to the rising of the first pulse signal in the next cycle is referred to as a halt period, which is indicated by the dotted line. When an oscillation period having four successive pulse signals is obtained again at the time point of "Y" before the free oscillation of the current Li is converged, the phase of the waveform of the current Li at a timing at which the first pulse signal in the next oscillation period is input and the FET Q1 is turned on is unknown. As described with reference to FIG. 3C, the waveform of the current Li has a larger phase shift as the time elapses, which is a cause of variations in supply capacity as the power supply circuit. Therefore, when the operation is regarded as the intermittent oscillation operation, the halt period is desired to be increased as much as possible so that the free oscillation of the current Li can be converged.

As described above, according to the second embodiment, with a simple and low-cost circuit configuration, the variations in output voltage due to the variations in components can be reduced while the oscillation frequency is decreased and the noise is reduced.

The power supply apparatus described in each of the first and second embodiments is applicable as a power source configured to supply electric power to units that require high voltages in, for example, an image forming apparatus. A description is now given of a configuration of an image forming apparatus to which one of the power supply apparatus according to the first and second embodiments is applied.

[Configuration of Image Forming Apparatus]

Figure 6:
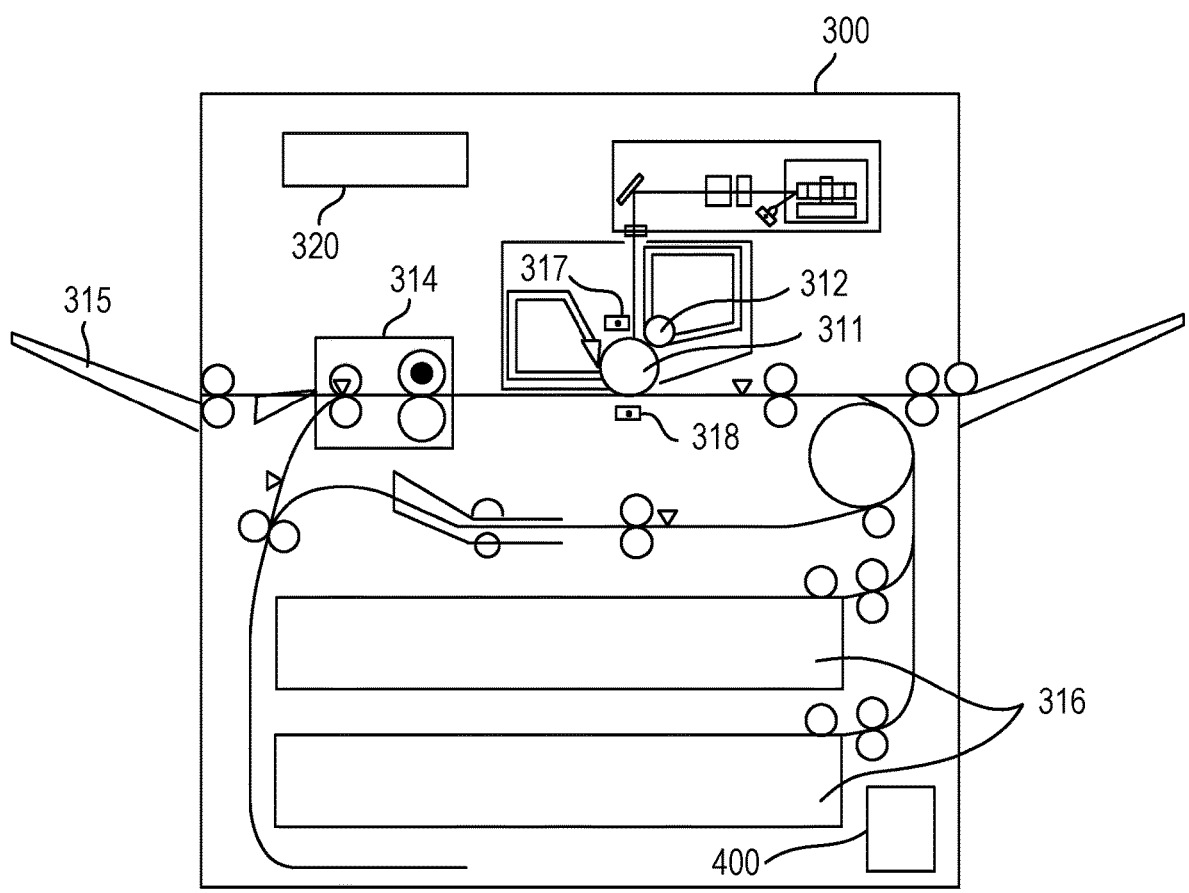
FIG. 6 is a diagram for illustrating a configuration of an image forming apparatus according to a third embodiment of the present invention.

A laser beam printer is described as an example of the image forming apparatus according to a third embodiment of the present invention. In FIG. 6, a schematic configuration of the laser beam printer as an example of an electrophotographic printer is illustrated. A laser beam printer 300 includes a photosensitive drum 311 serving as an image bearing member on which an electrostatic latent image is to be formed, a charging unit 317 (charging device) configured to uniformly charge the photosensitive drum 311, and a developing unit 312 (developing device) configured to develop the electrostatic latent image formed on the photosensitive drum 311 with toner. A toner image developed on the photosensitive drum 311 is transferred by a transfer unit 318 (transfer device) onto a sheet (not shown) serving as a recording material supplied from a cassette 316. The toner image transferred onto the sheet is fixed by a fixing device 314 and is discharged to a tray 315. The photosensitive drum 311, the charging unit 317, the developing unit 312, and the transfer unit 318 correspond to an image forming unit.

The laser beam printer 300 further includes a power supply apparatus 400 described in the first and second embodiments. The power supply apparatus 400 supplies a required voltage to the charging unit 317 and a required high voltage to the developing unit 312 and the transfer unit 318, for example. The image forming apparatus to which the power supply apparatus 400 according to the first and second embodiments is applicable is not limited to the one exemplified in FIG. 6. For example, the image forming apparatus may include a plurality of image forming units. Further, the image forming apparatus may include a primary transfer unit configured to transfer the toner image formed on the photosensitive drum 311 onto an intermediate transfer belt, and a secondary transfer unit configured to transfer the toner image formed on the intermediate transfer belt onto a sheet.

The laser beam printer 300 includes a controller 320 configured to control an image forming operation by the image forming unit and a sheet conveying operation. For example, the controller 320 may input a pulse signal from the input 1 (see FIG. 1) to the FET Q1 by controlling, for example, the time periods t1 and t2 (see FIG. 4A to FIG. 4C).

As described above, even in the image forming apparatus according to the third embodiment, with a simple and low-cost circuit configuration, the variations in output voltage due to the variations in components can be reduced while the oscillation frequency is decreased and the noise is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-098968, filed May 18, 2017, which is hereby incorporated by reference herein in its entirety.

What is claimed is:

1. A power supply apparatus comprising:
   an inductor;
   a switching element configured to be driven in accordance with each of a first input pulse signal and a second input signal risen after the first input pulse signal, the switching element connected in series to the inductor; and
   a booster circuit configured to amplify a voltage generated in the inductor, the booster circuit connected to both ends of the inductor, the booster circuit including a plurality of rectification units each including a diode and a capacitor,
   wherein the switching element is successively driven in accordance with the each of the first input pulse signal and the second input signal,
   wherein the switching element is controlled to repeat a switching pattern having a switching period in which the switching element is turned on and off at least twice and a stop period in which the switching element is not turned on after the switching period, the switching period being shorter than the stop period, and
   wherein during the switching period, an interval between the first input pulse signal and the second input signal is to be set so that a maximum value of a first voltage generated in the switching element after the switching element is turned on and off at a first time according to the first input pulse signal is smaller than a maximum value of a second voltage generated in the switching element after the switching element is turned on and off at a second time according to the second input pulse signal.

2. The power supply apparatus according to claim 1, wherein the first and second voltages generated by the switching element is a drain-source voltage of the switching element.

3. The power supply apparatus according to claim 2, wherein the switching element is driven so that the switching element is turned on at a timing of a second wave of a free oscillation wave of the inductor after the switching element is turned off for the first time.

4. The power supply apparatus according to claim 1, wherein a turn-on timing of the switching element is a timing at which a current flowing through the inductor flows in the same direction as a direction of a current flowing when the switching element is turned on.

5. The power supply apparatus according to claim 1, wherein after a last pulse signal among a plurality of pulse signals is input, oscillation of the switching element is halted in accordance with a time required for free oscillation of a current flowing through the inductor to converge from when the switching element is turned off, and then the next plurality of pulse signals are input to the switching element.

6. The power supply apparatus according to claim 5, wherein the switching element has an oscillation frequency, which is diffused by the plurality of pulse signals into a first frequency, which is obtained when the switching element is oscillated, and a second frequency, which is lower than the first frequency, and is obtained when the oscillation of the switching element is halted.

7. An image forming apparatus comprising:
an image forming unit configured to form an image on a recording material; and
a power supply apparatus configured to supply electric power to the image forming unit,
the power supply apparatus including:
an inductor;
a switching element configured to be driven in accordance with each of a first input pulse signal and a second input signal risen after the first input pulse signal, the switching element connected in series to the inductor; and
a booster circuit configured to amplify a voltage generated in the inductor, the booster circuit connected to both ends of the inductor, the booster circuit including a plurality of rectification units each including a diode and a capacitor,
wherein the switching element is successively driven in accordance with the each of the first input pulse signal and the second input signal,
wherein the switching element is controlled to repeat a switching pattern having a switching period in which the switching element is turned on and off at least twice and a stop period in which the switching element is not turned on after the switching period, the switching period being shorter than the stop period, and
wherein during the switching period, an interval between the first input pulse signal and the second input signal is to be set so that a maximum value of a first voltage generated in the switching element after the switching element is turned on and off at a first time according to the first input pulse signal smaller than a maximum value of a second voltage generated in the switching element after the switching element is turned on and off at a second time according to the second input pulse signal.

8. The image forming apparatus according to claim 7, wherein the first and second voltages generated by the switching element is a drain-source voltage of the switching element.

9. The image forming apparatus according to claim 8, wherein the switching element is driven so that the switching element is turned on at a timing of a second wave of a free oscillation wave of the inductor after the switching element is turned off for the first time.

10. The image forming apparatus according to claim 7, wherein a turn-on timing of the switching element is a timing at which a current flowing through the inductor flows in the same direction as a direction of a current flowing when the switching element is turned on.

11. The image forming apparatus according to claim 7, wherein after a last pulse signal among a plurality of pulse signals is input, oscillation of the switching element is halted in accordance with a time required for free oscillation of a current flowing through the inductor to converge from when the switching element is turned off, and then the next plurality of pulse signals are input to the switching element.

12. The image forming apparatus according to claim 11, wherein the switching element has an oscillation frequency diffused by the plurality of pulse signals into a first frequency obtained when the switching element is oscillated, and a second frequency lower than the first frequency, the second frequency obtained when the oscillation of the switching element is halted.

13. The image forming apparatus according to claim 7, wherein the image forming unit includes any one of:
a charging unit configured to charge an image bearing member;
a developing unit configured to develop a latent image formed on the image bearing member as an image with use of toner; and
a transfer unit configured to transfer the image formed on the image bearing member onto a transfer member.

* * * * *